United States Patent [19]

Lippert

[11] Patent Number: 6,065,098

[45] Date of Patent: May 16, 2000

[54] METHOD FOR MAINTAINING MULTI-LEVEL CACHE COHERENCY IN A PROCESSOR WITH NON-INCLUSIVE CACHES AND PROCESSOR IMPLEMENTING THE SAME

[75] Inventor: Gary Michael Lippert, Kasson, Minn.

[73] Assignee: International Business Machines Corporation, Armonk, N.Y.

[21] Appl. No.: 08/932,826

[22] Filed: Sep. 18, 1997

[51] Int. Cl.[7] ..................................................... G06F 13/00
[52] U.S. Cl. .......................... 711/122; 711/118; 711/119; 711/123; 711/141; 711/146
[58] Field of Search ........................... 711/111, 119, 122, 711/123, 141, 146, 140, 118

[56] References Cited

U.S. PATENT DOCUMENTS

| | | | |
|---|---|---|---|
| 5,404,482 | 4/1995 | Stamm et al. | 711/145 |
| 5,404,483 | 4/1995 | Stamm et al. | 711/144 |
| 5,717,897 | 2/1998 | McCrory | 710/111 X |
| 5,787,478 | 7/1998 | Hicks et al. | 711/141 |
| 5,809,530 | 9/1998 | Samra et al. | 711/140 |

FOREIGN PATENT DOCUMENTS

| | | | |
|---|---|---|---|
| 0404128 A2 | 6/1990 | European Pat. Off. | G06F 12/08 |
| 0481233 A2 | 9/1991 | European Pat. Off. | G06F 12/08 |
| 0559409 A1 | 3/1993 | European Pat. Off. | G06F 13/364 |

OTHER PUBLICATIONS

"Tradeoffs in Two–Level On–Chip Caching", Jouppi et al. IEEE. 1994. pp. 34–45.

Israel, Paul et al, 1995 Electronic Engineering Times (Jun. 19), pp. 78–80, "Chip Set Aims to Speed Secondary Cache—Parallelism Enhances Level 2 Cache Runs".

Jouppi, Norman P., 17th Annual International Symposium on Computer Architecture (May 28–31, 1990), pp. 364–373, "Improving Direct–Mapped Cache Performance by the Addition Of A Small Fully–Associative Cache and Prefetch Buffers".

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stiliadis, Dimitrios et al, IEEE Transactions on Computers, vol. 46, No. 5 (May 1997), pp. 603–610, "Selective Victim Caching: A Method to Improve the Performance of Direct–apped Caches".

*Primary Examiner*—Do Hyun Yoo
*Assistant Examiner*—Than Nguyen
*Attorney, Agent, or Firm*—Michael K. Mutter; Gary D. Yacura

[57] ABSTRACT

The processor includes at least a lower and a higher level non-inclusive cache, and a system bus controller. The system bus controller snoops commands on the system bus, and supplies the snooped commands to each level of cache. Additionally, the system bus controller receives the response to the snooped command from each level of cache, and generates a combined response thereto. When generating responses to the snooped command, each lower level cache supplies its responses to the next higher level cache. Higher level caches generate their responses to the snooped command based in part upon the response of the lower level caches. Also, high level caches determine whether or not the cache address, to which the real address of the snooped command maps, matches the cache address of at least one previous high level cache query. If a match is found by a high level cache, then the high level cache generates a retry response to the snooped command, which indicates that the snooped command should be resent at a later point in time, in order to prevent a collision between cache queries.

13 Claims, 9 Drawing Sheets

| TC Response | L1 Response | L2 Response | Combined Response |
|---|---|---|---|
| Retry | Any | Any | Retry |
| Any | Retry | Any | Retry |
| Any | Any | Retry | Retry |
| Modified | Not Retry | Not Retry | Modified |
| Not Retry | Modified | Not Retry | Modified |
| Not Retry | Not Retry | Modified | Modified |
| Shared | Shared/Null | Shared/Null | Shared |
| Shared/Null | Shared | Shared/Null | Shared |
| Shared/Null | Shared/Null | Shared | Shared |
| Null | Null | Null | Null |

FIGURE 4

| L(n) Response | L(n+1) MESI | L(n+1) Response |
|---|---|---|
| Retry | No Change | Any |
| Modified | No Change | Retry |
| Modified | MESI->I | Not Retry |
| Shared | No Change | Retry |
| Shared | M | |
| Shared | ES->SI | Shared |
| Shared | I | Null |
| Null | No Change | Retry |
| Null | M->MSI | Modified |
| Null | ES->SI | Shared |
| Null | I | Null |

FIGURE 8

METHOD FOR MAINTAINING MULTI-LEVEL CACHE COHERENCY IN A PROCESSOR WITH NON-INCLUSIVE CACHES AND PROCESSOR IMPLEMENTING THE SAME

BACKGROUND OF THE INVENTION

1. Field of the Invention

The present invention relates to a method for maintaining multi-level cache coherency in a processor with non-inclusive caches and the processor implementing the same.

2. Description of Related Art

To maintain data integrity in conventional multi-processor systems, the caches in each processor associate a memory coherency image state, e.g., MESI state, with each cache line, and the highest level cache snoops, i.e., performs a form of monitoring, commands on a system bus to continually update the memory coherency state for each cache line. Such conventional processors include inclusive caches, which means that the higher level caches store the same cache lines stored in the lower level caches as well as cache lines not stored in the lower level caches.

For instance, in a processor having a level one or L1 cache and an external level two or L2 cache, the L1 cache, by design, is disposed closer to the execution units of the processor and has a lower storage capacity than the L2 cache such that the L1 cache has a lower access time. The L2 cache, however, stores a larger number of cache lines and includes all the cache lines stored in the L1 cache. Because of this inclusivity, only the L2 cache needs to snoop commands on the system bus and generate responses thereto.

Specifically, a cache snoops a command by determining whether the real address associated with the snooped command matches the real address of a cache line stored therein. If a match is found, the cache updates the memory coherency image state for the cache line in a well-known manner, and outputs a snoop response based on the updated memory coherency image state in a well-known manner. If no match is found, the cache outputs a snoop response indicating no match found.

Using inclusive caches, however, requires higher level caches (1) to track the cache lines stored in the lower level caches, and (2) to constantly update the cache lines stored therein based on changes in the cache lines stored by the lower level caches. By using non-inclusive caches, both the tracking and updating functions can be eliminated. Because the caches are non-inclusive, each cache must be considered when snooping a command. Outputting multiple responses to one snooped command from a single processor, however, increases the complexity of maintaining data integrity.

SUMMARY OF THE INVENTION

One object of the present invention is to provide a method for maintaining multi-level cache coherency in a processor with non-inclusive caches.

Another object of the present invention is to provide a processor with non-inclusive caches which maintains coherency therebetween.

A further object of the present invention is to provide a method and higher level cache which prevent collisions between two cache queries, one of which is the result of a snooped command.

These and other objectives are achieved by providing a processor which includes at least a lower and a higher level non-inclusive cache, and a system bus controller. The system bus controller snoops commands on the system bus, and supplies the snooped commands to each level of cache. Additionally, the system bus controller receives the snoop responses to the snooped command from each level of cache, and generates a combined response thereto.

When generating responses to the snooped command, each lower level cache supplies its response to the next higher level cache. Higher level caches generate their response to the snooped command based in part upon the response of the lower level caches. Also, high level caches determine whether or not the cache address, to which the real address of the snooped command maps, matches the cache address of at least one previous high level cache query. If a match is found by a high level cache, then the high level cache generates a retry response to the snooped command, which indicates that the snooped command should be resent at a later point in time, in order to prevent a collision between cache queries.

Other objects, features, and characteristics of the present invention; methods, operation and functions of the related elements of the structure; combination of parts; and economies of manufactural will become apparent from the following detailed description of the preferred embodiments and accompanying drawings, all of which form a part of the specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 illustrates a table showing the generation of the combined response by the priority combining logic according to the present invention;

FIG. 8 illustrates a Table which shows a higher level cache's snoop response based in part on the response from the lower level cache.

Figure 1:
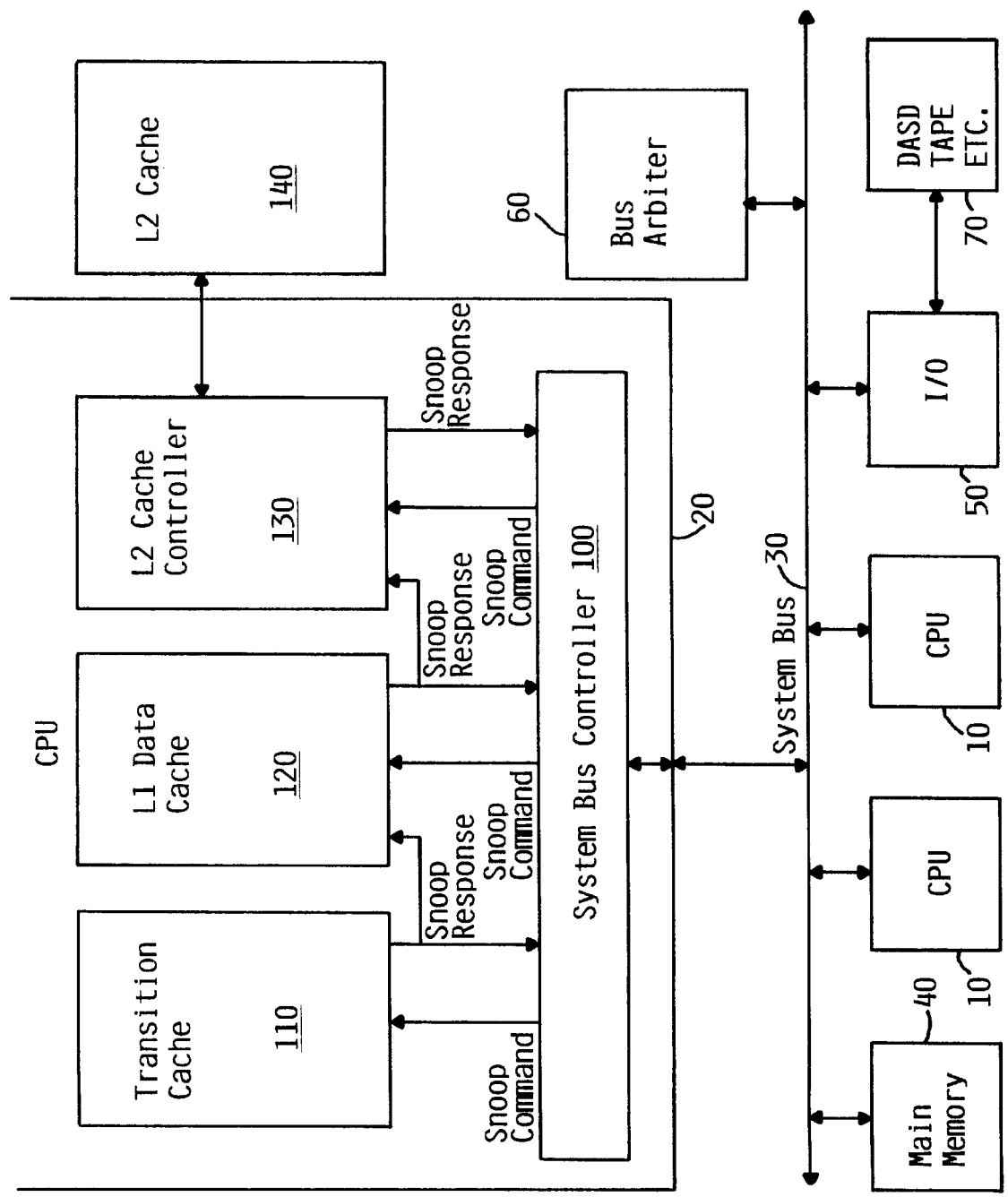
FIG. 1 illustrates a multi-processor system including a processor with non-inclusive caches which employs the method for obtaining multi-level cache coherency according to the present invention.

It is respectfully suggested that FIG. 1 be printed on the face of the patent.

DETAILED DESCRIPTION OF THE PREFERRED EMBODIMENTS

As described in detail below, the processor with non-inclusive caches according to the present invention includes a system bus controller which snoops commands on a system bus, and delays supplying those snooped commands to lower levels of cache. The delay times are set such that each lower level cache will output a snoop response at a known point in time. Based on the snoop response from each level of cache, the system bus controller generates a single combined response, and outputs the combined response on the system bus. Besides generating snoop responses based on the snooped commands, higher level caches also generate their snoop responses based on the snoop responses of lower level caches. In this manner, the memory coherency image states in the higher level caches are efficiently updated.

FIG. 1 illustrates a multi-processor system including a processor with non-inclusive caches which employs the method for maintaining multi-level cache coherency according to the present invention. The system includes a system bus 30 interconnecting multiple processors 10 and at least one processor 20 with non-inclusive caches. A main memory 40, one or more input/output or I/O interfaces 50, and a bus arbiter 60 are also connected to the system bus 30. Direct access storage devices or DASD, tape storage devices, etc. 70 are connected to the I/O interfaces 50.

The multiple processors 10 and the processor 20 communicate over the system bus 30 with each other, the main memory 40, and the I/O interfaces 50. The I/O interfaces 50 control the operation of such input and output devices as DASD, tape storage devices, etc. The main memory 40 serves as central storage for the multi-processor system, and stores, for instance, all the cache lines in the system. The bus arbiter 60 decides which of the devices connected to the system bus 30 drives the system bus 30 based on any well-known protocol. Also, for each command placed on the system bus 30, the bus arbiter 60 collects the snoop responses thereto, and generates as the system response the highest priority response collected.

Besides the processor 20, one or more of the multiple processors 10 could also be a processor with non-inclusive caches. As shown in FIG. 1, the processor 20 includes a system bus controller 100 which controls communication between the system bus 30 and the processor 20. A transition cache 110, level one or L1 data cache 120, with controller included, and a level two or L2 cache controller 130 are connected to the system bus controller 100. A level two or L2 cache 140, external to the processor 20, is connected directly to the L2 cache controller 130.

FIG. 1 further illustrates that the snoop response of the transition cache 110 is supplied to the L1 data cache 120, and that the snoop response of the L1 data cache 120 is supplied to the L2 cache controller 130. It should be understood that the various paths illustrated in FIG. 1 have been represented in greatly simplified form for clarity. In reality, many separate data paths into and out of the various components are required. Furthermore, for the sake of clarity, many of the data and control lines have been eliminated entirely from the figures. It will also be appreciated that, for clarity, other components forming the processor 20, such as execution units, have been eliminated from FIG. 1.

The L1 data cache 120 has a lower storage capacity, but faster access time, than the L2 cache 140. Also, unlike what is characteristic of conventional processors, the L2 cache 140 is non-inclusive. Specifically, the L2 cache 140 does not store all of the cache lines stored in the L1 data cache 120. Consequently, the response to a snooped command provided by the L2 cache controller 130 does not represent the response to the same snooped command which could be issued by the L1 data cache 120.

As implied above, the L2 cache controller 130 controls the communication of data and commands to the L2 cache 140. Although not illustrated in the figures, the transition cache 110 handles the communication of commands and data between the system bus controller 100, the L1 data cache 120 and, via the L2 cache controller 130, the L2 cache 140. As mentioned above, for the purpose of clarity, the connections to effect such communication between the transition cache 110 and the other components of the processor 20 have not been illustrated for the sake of clarity. Also, any direct connections between the L1 data cache 120 and the L2 cache 140 have also been eliminated for clarity.

The transition cache 110 is a transition cache such as disclosed in application Ser. No. 08/761,378 to Freerksen et al., filed Dec. 9, 1996; hereby incorporated by reference. Alternatively, however, the transition cache 110 could be replaced by cache line buffers which maintain the memory coherency image state of each cache line stored therein.

For purposes of discussion, the present invention will be discussed using the well-known MESI state protocol as the memory coherency image state protocol employed by the multi-processor system. It should be understood, however, that any memory coherency image protocol could be used with the present invention.

As is well-known, the MESI states are Modified, Exclusive, Shared and Invalid. The possible snoop responses in order from highest priority to lowest priority are: retry, indicating that the snooped command should be retried at a later point in time; the MESI state Modified; the MESI state Shared; and null, indicating no real address match.

Next, the operation of the processor 20 with respect to generating a single combined response to a snooped command will be discussed. During operation, the system bus controller 100 snoops commands on the system bus 30. The system bus controller 100 then supplies the snooped command to the transition cache 110, the L1 data cache 120 and the L2 cache controller 130. The system bus controller 100, however, does not simultaneously supply the snooped command to the transition cache 110, the L1 data cache 120, and the L2 cache controller 130.

Figure 2:
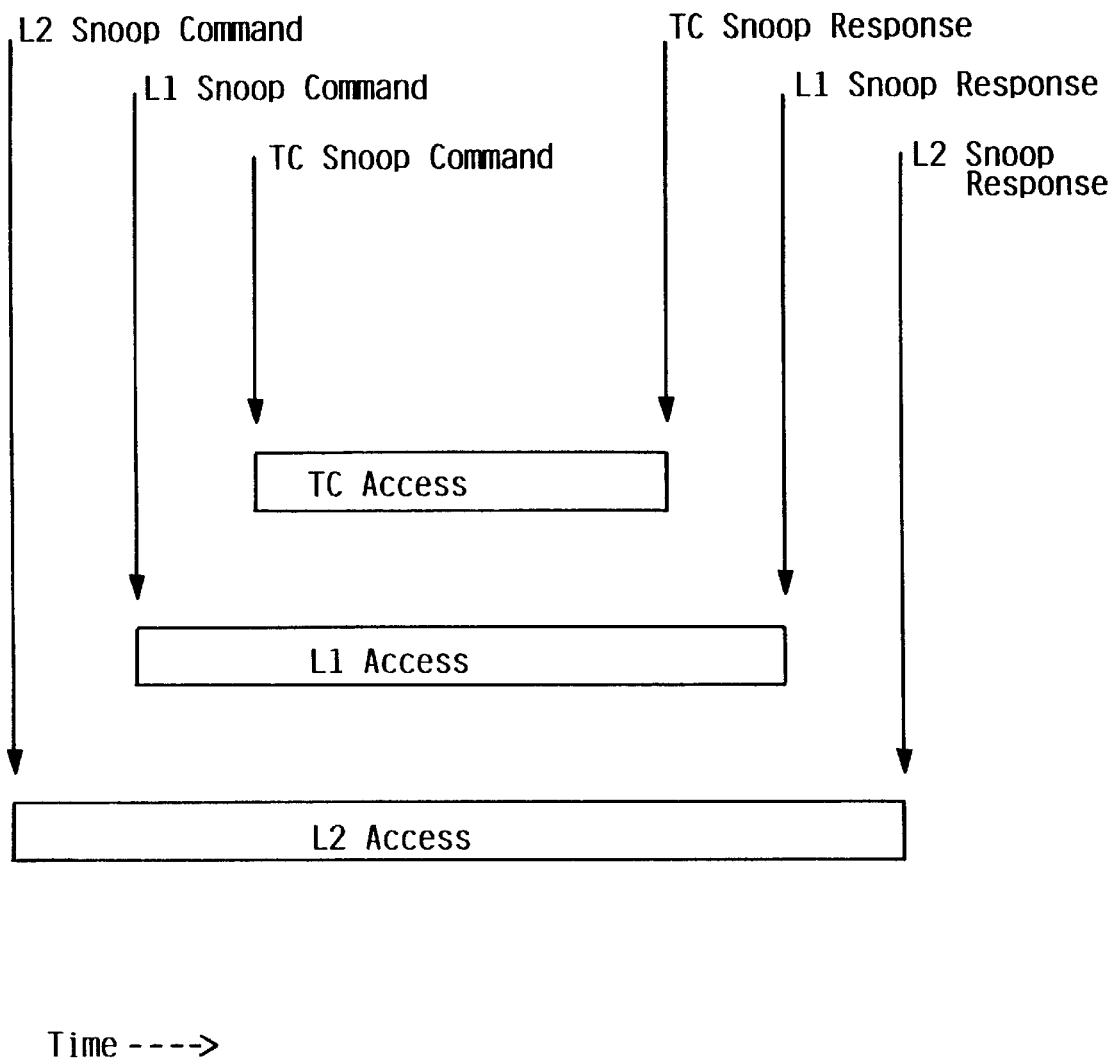
FIG. 2 illustrates the adjustments to the times at which the snoop commands are supplied to each level of cache by the processor according to the present invention.

As discussed above, the L1 data cache 120 has a faster access time then the L2 cache 140. Similarly, the transition cache 110, which has a smaller storage capacity than even the L1 data cache 120, has a faster access time than the L1 data cache 120. As shown in FIG. 2, the system bus controller 100 adjusts the time at which the snooped command is supplied to the transition cache 110, the L1 cache 120 and the L2 cache controller 130 such that the responses to the snooped command generated by the transition cache 110, the L1 data cache 120 and the L2 cache controller 130 are output at a known or a fixed time. More specifically, as shown in FIG. 2, the snooped command is supplied to the L2 cache controller 130 first, then after a predetermined period of time, the snooped command is supplied to the L1 data cache 120. After a further predetermined period of time, the snooped command is supplied to the transition cache 110.

Even in view of the delay, the transition cache 110 will generate its response prior to the L1 data cache 120 and the L2 cache controller 130 generating responses. Similarly, the L1 data cache 120 will generate a response to the snooped command prior to the L2 cache controller 130 generating a response. As stated above, the delays in supplying the snooped command to the transition cache 110 and the L1 data cache 120 are set such that the transition cache 110 and the L1 data cache 120 output their respective responses at known or fixed points in time.

When a cache such as the transition cache 110, the L1 data cache 120, and the L2 cache controller 130 receive a snooped command, the cache determines whether or not the real address associated with the snooped command matches the real address of any cache lines stored therein. If a match is found, the MESI state for that cache line is modified in a well-known manner based on the snooped command, and regardless of whether a match is found, a snoop response is generated. In the L1 data cache 120, the MESI state and snoop response are further modified based on the snoop response of the transition cache 110. Similarly, the MESI state and snoop response of the L2 cache controller 130 are further modified based on the snoop response of the L1 data cache 120.

FIG. 8 illustrates the snoop responses generated by a higher level L(n+1) cache given the MESI state of the higher level L(n+1) cache and the snoop response from the lower level L(n) cache. In FIG. 8, "M" stands for Modified, "E" stands for Exclusive, "S" stands for shared, and "I" stands for invalid. Also, "→" indicates a change in the MESI state based on the snooped command.

Figure 3:
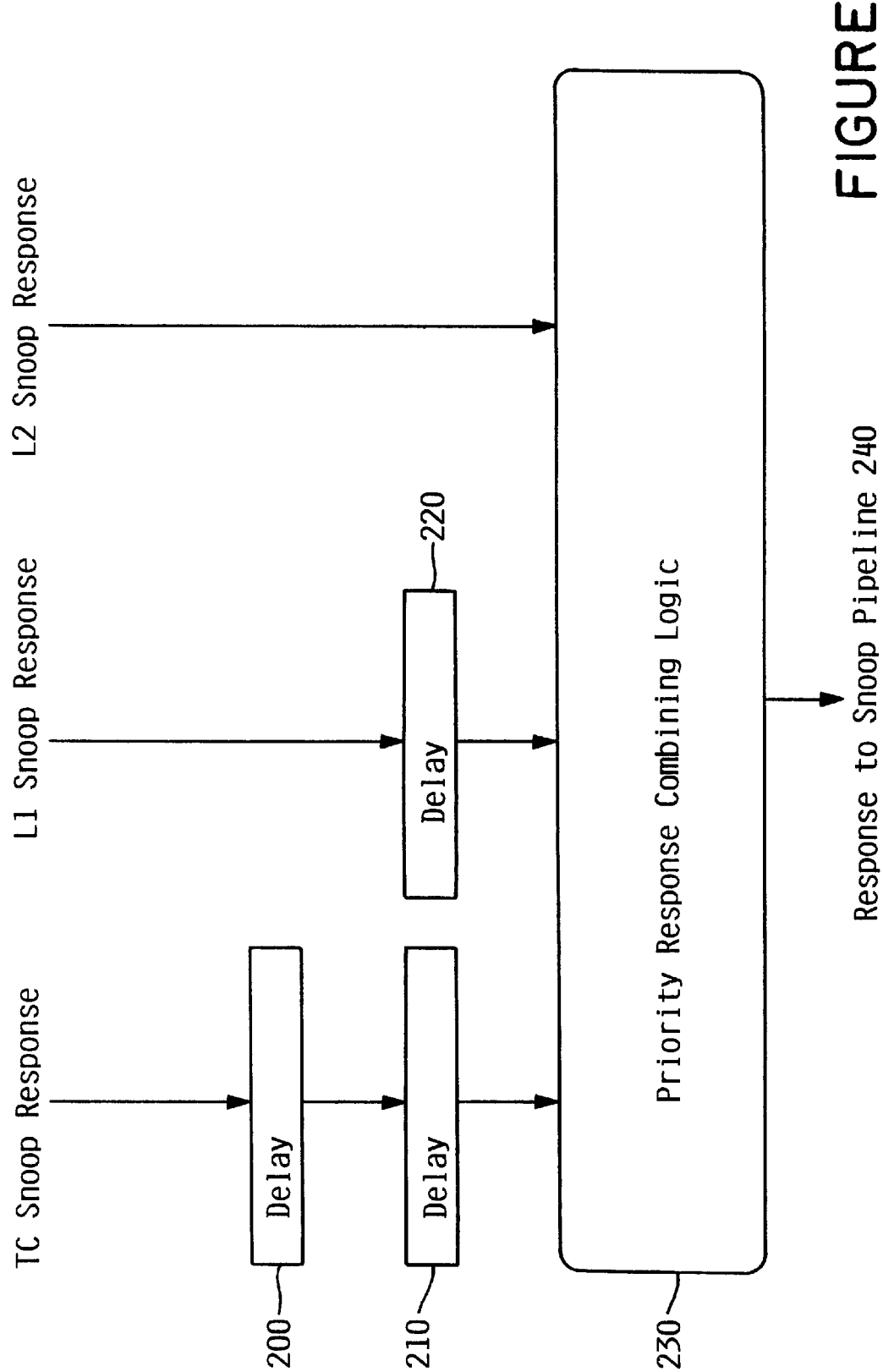
FIG. 3 illustrates a portion of the system bus controller according to the present invention.

The system bus controller 100 receives the snoop responses from the transition cache 110, the L1 data cache 120, and the L2 cache controller 130. The portion of the system bus controller 100 handling the snoop responses from the transition cache 110, the L1 data cache 120, and the L2 cache 130 is illustrated in greater detail in FIG. 3. As shown in FIG. 3, the snoop responses from the transition cache 110, the L1 data cache 120 and the L2 cache controller 130 are received by priority response combining logic 230. The response from the transition cache 110, however, is delayed by a first delay 200 and a second delay 210 prior to receipt by the priority response combining logic 230. Also, the snoop response from the L1 data cache 120 is delayed by a third delay 220 prior to receipt by the priority response combining logic 230. The first, second and third delays 200, 210 and 220 delay a signal by the same period of time in a preferred embodiment of the present invention. Also, the delay time of the first, second and third delays 200, 210 and 220 is set such that the priority response combining logic 230 receives the response from the transition cache 110, the L1 data cache 120 and the L2 cache controller 130 substantially at the same time. The priority response combining logic 230 then generates a single combined response based on the responses from the transition cache 110, the L1 data cache 120 and the L2 cache controller 130 in accordance with the Table shown in FIG. 4.

Figure 5:
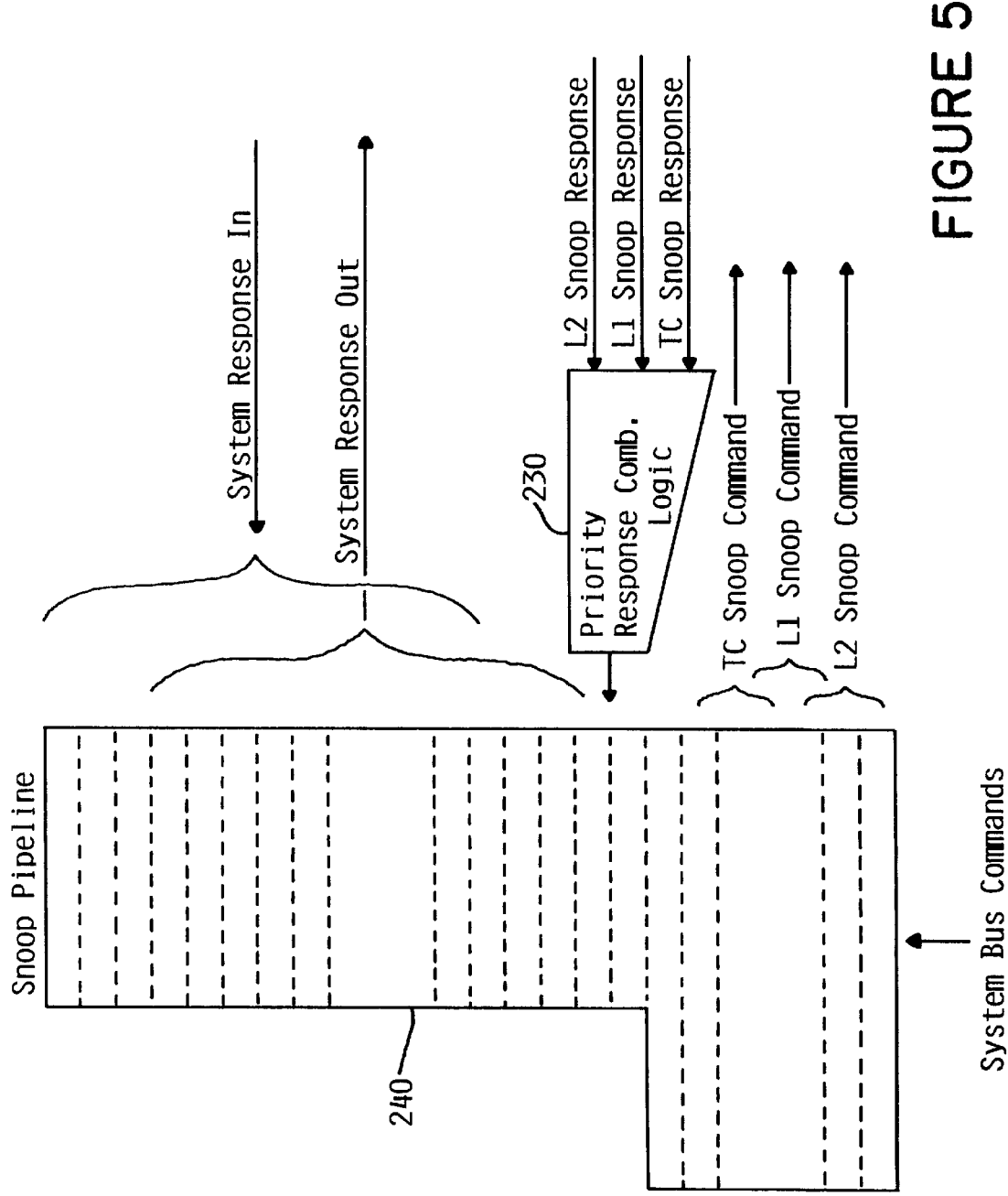
FIG. 5 illustrates the snoop pipeline in the system bus controller according to the present invention.
Figure 6A:
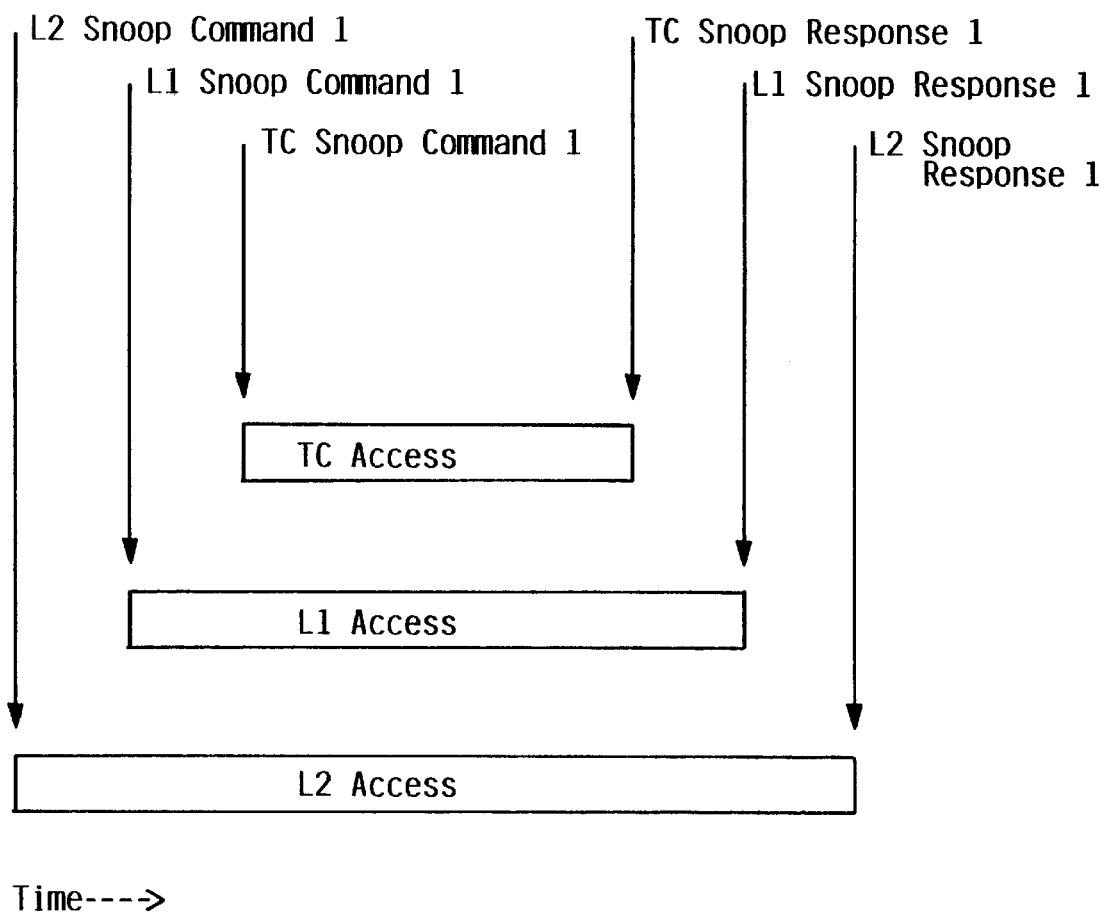
FIG. 6 illustrates the timing of overlapping snooped commands.
Figure 6B:
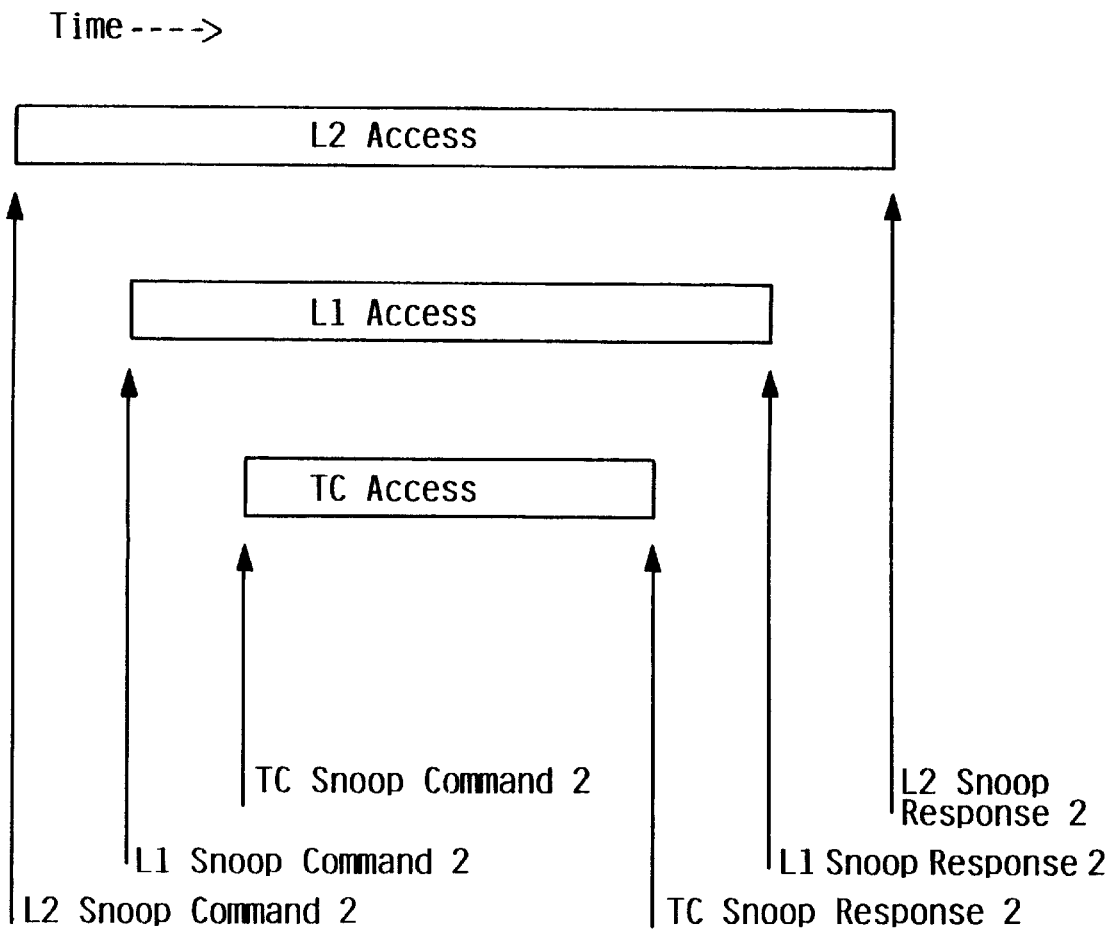

As shown in FIG. 3, the priority response combining logic 230 outputs the combined response to a snoop pipeline 240. The snoop pipeline 240 is illustrated in FIG. 5. As shown in FIG. 5, when the system bus controller 100 snoops a command, the command is stored in the snoop pipeline 240, i.e., memory in the system bus controller 100. As time goes on, the snooped command flows through the snoop pipeline 240. The operations taking place with respect to the snooped command are illustrated to the right of the snoop pipeline 240 in chronological order. As shown, the snooped command is sent to the L2 cache controller 130, then sent to the L1 data cache 120, and finally, sent to the transition cache 110. At some point in time prior to the receipt of the combined response from the priority response combining logic 230, portions of the snooped command are no longer needed, and thus, as shown in FIG. 5, the amount of information stored with respect to a snooped command decreases. Soon afterwards, the combined response output by the priority response combining logic 230 is stored with the snooped command. The combined response to the snooped command is then output on the system bus 30 by the system bus controller 100, and later a system response is received and associated with the snooped command. Eventually, because the snoop pipeline 240 has a finite length, the snooped command is removed therefrom. As shown in FIG. 6, pipelining of snooped commands allows overlap thereof.

Because of the longer access time of the L2 cache 140, the possibility of a collision between two L2 queries, the second of which is the result of a snooped command, exists.

A collision occurs when the two L2 queries map to the same cache address, i.e., have the same congruence class. Because of this collision, an improper response to the snooped command can be generated. For instance, suppose that the L2 cache controller 130 receives a fill request indicating a miss in the L1 data cache 120, and in response the L2 cache 140 performs an aging castback, discussed below.

Because caches have limited storage space, more than one real address can map to the same cache address. When this occurs between a cache line currently stored and a cache line to be received, the currently stored cache line is sent to, for instance, the main memory 40. Treating the currently stored cache line in this manner is called an aging castback.

When the L2 cache controller 130 performs an aging castback with respect to a cache line stored in the L2 cache 140, the cache line being castback is first transferred to the transition cache 110. The transition cache 110 then transfers the cache line to the main memory 40 via the system bus controller 100 and the system bus 30.

Next, suppose that the L2 cache controller 130 snoops a command having a real address which maps to the same cache address as the cache line which was the subject of the aging castback. If this collision were not prevented, the L2 cache controller 130 would generate a null response because the cache line was castback. If, however, the cache line had not been completely transferred to the transition cache 110 yet, then the transition cache 110 would also output a null response. Absent the collision, the L2 cache controller 130, or perhaps the transition cache 110, would have generated a non-null response. Therefore, the combined response issued by the system bus controller 100 may be improper.

The present invention avoids this problem by preventing such collisions. Namely, when the real address for a snooped command maps to the same cache address as another L2 query, the snooped command is not processed. Instead, the L2 cache controller 130 generates a retry response with respect to the snooped command, which instructs the system to retry issuing this command at a later point in time.

Figure 7:
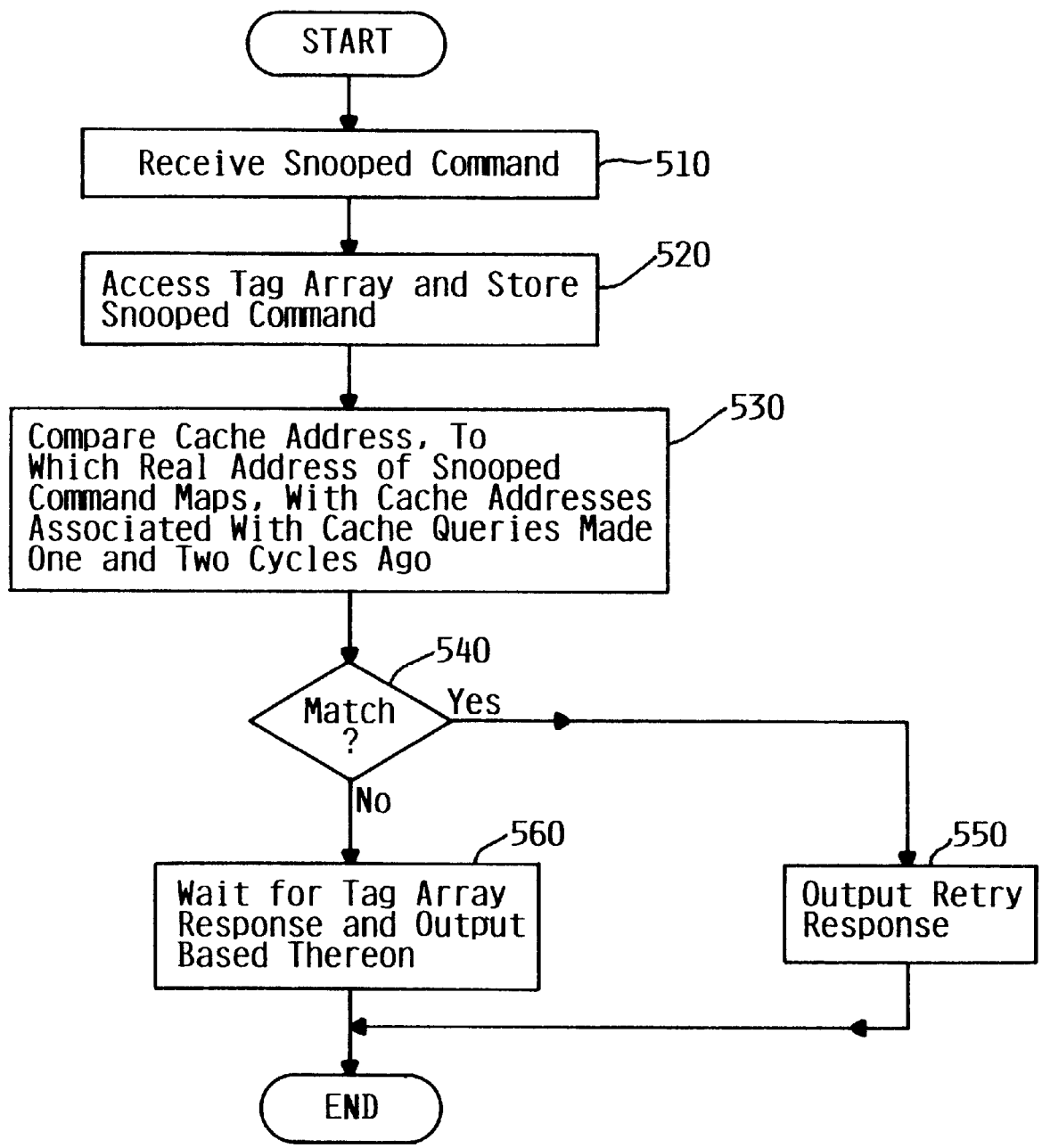
FIG. 7 illustrates a flow chart of the method for preventing collisions between two cache queries in high level caches where one of the cache queries is the result of a snooped command.

The method for preventing collisions between a snooped command and another command will be described referring to the flow chart illustrated in FIG. 7. In step S10, the L2 cache controller 130 receives a snooped command. Then, in step S20, the L2 cache controller 130 accesses the tag array or directory for the L2 cache 140, and stores the snooped command. In response to the tag array access, the L2 cache controller 130 will determine if the real address of a cache line stored in L2 cache 140 matches the real address associated with the snooped command. If a match exists, the L2 cache controller 130 accesses, from the L2 cache 140, the MESI state associated with the cache line, and, in step S60 discussed below, generates a snoop response based the MESI state. If no match exists, the null snoop response will be generated in step S60.

In step S30, the L2 cache controller 130 compares the cache address, to which the real address of the snooped command maps, to the cache addresses associated with the L2 queries made one cycle ago and two cycles ago. Then in step S40, the L2 cache controller 130 determines whether a cache address match exists. If a match is found, the L2 cache controller 130 will output a retry response with respect to the snooped command in step S50. As shown in FIG. 4, because the L2 cache controller 130 outputs a retry response, the system bus controller 100 outputs a retry response as the combined response. As mentioned above, the retry response instructs the system to retry issuing the command at a later point in time. If no match is found, the L2 cache controller 130 waits for, in step S60, the response to the tag array access made in step S20, and once that response is received, the L2 cache controller 130 outputs a snoop response to the snooped command. In this manner, collisions between a snooped command and other commands can be detected and prevented.

It should be understood that the present invention is not limited to a processor with only two levels of cache. Instead, additional levels of non-inclusive cache could be included, with the method for preventing collisions according to the present invention being applied to the second and higher levels of cache.

While the invention has been described with what is presently considered the most practical and preferred embodiments, it is to be understood that the invention is not limited to the disclosed embodiments, but on the contrary, is intented to cover various modifications and equivalent arrangements included within the spirit and scope of the appended claims.

What is claimed is:

1. A method for maintaining multi-level cache coherency in a processor with non-inclusive caches, comprising the steps of:
    (a) snooping a command on a system bus;
    (b) supplying said snooped command to each level of cache;
    (c) generating a response to said snooped command at each level of cache; and
    (d) generating a combined response to said snooped command from said responses output in said step (c); and wherein
    said step (b) delays supplying said snooped command to at least lower level caches such that lower level caches have a greater supply delay than higher level caches.

2. A method for maintaining multi-level cache coherency in a processor with non-inclusive caches, comprising the steps of:
    (a) snooping a command on a system bus;
    (b) supplying said snooped command to each level of cache;
    (c) generating a response to said snooped command at each level of cache; and
    (d) generating a combined response to said snooped command from said responses output in said step (c); and wherein
    said step (c) further includes,
        (c1) generating a response at a lower level cache;
        (c2) supplying said response to said snooped command from said lower level cache to a higher level cache, which is a higher level of cache than said lower level cache; and
        (c3) generating a response at said higher level cache in response to said snooped command based in part on said response from said lower level cache.

3. A method for maintaining multi-level cache coherency in a processor with non-inclusive caches, comprising the steps of:
    (a) snooping a command on a system bus;
    (b) supplying said snooped command to each level of cache;
    (c) generating a response to said snooped command at each level of cache; and wherein
    said step (c) includes,
        (c1) generating a response at a lower level cache;
        (c2) comparing a cache address, to which a real address of said snooped command maps, with a cache address of at least one previous cache query at a higher level cache, which is a higher level of cache than said lower level cache; and
        (c3) generating a retry response at said higher level cache if said step (c2) indicates a match between said cache address of said snooped command and said cache address of said previous cache query.

4. The method of claim 3, wherein said step (c2) compares said cache address of said snooped command with cache addresses of two previous cache queries.

5. A processor, comprising:
    at least one higher level non-inclusive cache and a lower level cache, said higher level cache being a higher level of cache than said lower level cache; and
    a system bus controller snooping a command on a system bus, supplying said snooped command to each level of cache, and generating a combined response to said snooped command based on responses from each level of cache; and wherein
    said higher level cache receives said snooped command and a response generated by said lower level cache to said snooped command, and generates a response to said snooped command based on said snooped command and said response generated by said lower level cache to said snooped command.

6. A processor, comprising:
    at least one higher level non-inclusive cache and a lower level cache, said higher level cache being a higher level of cache than said lower level cache; and
    a system bus controller snooping a command on a system bus, supplying said snooped command to each level of cache, and generating a combined response to said snooped command based on responses from each level of cache; and wherein
    said higher level cache receives said snooped command, compares a cache address, to which a real address of said snooped command maps, with a cache address of at least one previous cache query, and generates a retry response if a match exists between said cache address of said snooped command and said cache address of said previous cache query.

7. The processor of claim 6, wherein said higher level cache compares said cache address of said snooped command to cache addresses of two previous cache queries.

8. A processor, comprising:
    at least one higher level non-inclusive cache and a lower level cache, said higher level cache being a higher level of cache than said lower level cache; and
    a system bus controller snooping a command on a system bus, supplying said snooped command to each level of cache, and generating a combined response to said snooped command based on responses from each level of cache; wherein
    said system bus controller includes,
        priority response combining logic for generating said combined response to said snooped command based on responses from each level of cache, and delay means for delaying responses from at least said lower level cache such that said priority response combining logic substantially simultaneously receives said responses from said lower level cache and said higher level cache.

9. A processor, comprising:

at least one higher level non-inclusive cache and a lower level cache, said higher level cache being a higher level of cache than said lower level cache; and a system bus controller snooping a command on a system bus, supplying said snooped command to each level of cache, and generating a combined response to said snooped command based on responses from each level of cache; and wherein said system bus controller delays supplying said snooped command to at least said lower level cache.

10. The processor of claim 9, wherein said system bus controller comprises:

priority response combining logic for generating said combined response to said snooped command based on responses from each level of cache; and delay means for delaying responses from at least said lower level cache such that said priority response combining logic substantially simultaneously receives said responses from said lower level cache and said higher level cache.

11. A processor, comprising:

at least first and second higher level non-inclusive caches and a lower level cache, said first and second higher level caches being higher level caches than said lower level cache, said lower level cache being a transition cache, said first higher level cache being a level one cache, and said second higher level cache being a level two cache; and a system bus controller snooping a command on a system bus, supplying said snooped command to each level of cache, and generating a combined response to said snooped command based on responses from each level of cache.

12. The processor of claim 11, wherein said level one cache receives said snooped command and a response generated by said transition cache to said snooped command, and generates a response to said snooped command based on said snooped command and said response generated by said transition cache to said snooped command; and said level two cache receives said snooped command and said response generated by said level one cache to said snooped command, and generates a response to said snooped command based on said snooped command and said response generated by said level one cache to said snooped command.

13. A processor, comprising:

a transition cache, a level two non-inclusive cache and a level one cache, said level one cache being non-inclusive with respect to said transition cache; and a system bus controller snooping a command on a system bus, supplying said snooped command to each level of cache, and generating a combined response to said snooped command based on responses from each level of cache.

* * * * *